United States Patent [19]
Mizokawa et al.

[11] Patent Number: 4,510,494
[45] Date of Patent: Apr. 9, 1985

[54] LOOP TYPE DATA HIGHWAY SYSTEM

[75] Inventors: Sadao Mizokawa; Takuji Hamada; Hiroshi Tomizawa; Hitoshi Fushimi, all of Hitachi, Japan

[73] Assignee: Hitachi, Ltd., Tokyo, Japan

[21] Appl. No.: 395,327

[22] Filed: Jul. 6, 1982

[30] Foreign Application Priority Data

Jul. 6, 1981 [JP] Japan ................. 56-104483

[51] Int. Cl.³ .................................. H04Q 9/00
[52] U.S. Cl. .................. 340/825.05; 370/86; 340/825.08
[58] Field of Search ............ 340/825.05, 825.08, 340/825.5; 370/89, 86, 80

[56] References Cited
U.S. PATENT DOCUMENTS

| 3,755,786 | 8/1973 | Dixon et al. | 370/89 |
| 4,236,245 | 11/1980 | Freeny et al. | 370/89 |
| 4,237,553 | 12/1980 | Larsen | 370/89 |
| 4,335,426 | 6/1982 | Maxwell | 370/86 |
| 4,346,440 | 8/1982 | Kyu et al. | 370/86 |
| 4,383,315 | 5/1983 | Torng | 340/825.05 |

OTHER PUBLICATIONS

Abstract Page, European Patent Application, Publication Number 0054077 "Method of Transmitting Information Between Stations Attached to a Unidirectional Transmission Ring", B. Werner et al., Jun. 23, 1982, (Bulletin 82/25).

Primary Examiner—Donald J. Yusko
Attorney, Agent, or Firm—Antonelli, Terry & Wands

[57] ABSTRACT

A loop type data highway system in which a plurality of data transmission control stations (abbreviated herein as stations) are connected in cascade to a loop transmission line. Each of the stations responds to a polling frame inquiring of request for reservation of the transmission line. The polling frame is composed of a first field for inquiring of the line reservation request and a second field indicative of whether the line is reserved or not. Each station receives signals inputted from the upstream side along the line and sequentially repeats them to the downstream side along the line without delay. In the station having the line reservation requests, a pattern representative of the line reservation is written in the second field after reception of the first field and sends out the polling frame to the downstream. When the second field as received indicates the non-reserved state of the transmission line, transmission of data is initiated in succession to the second field.

4 Claims, 8 Drawing Figures

LOOP TYPE DATA HIGHWAY SYSTEM

The present invention relates to a loop type data highway system in which a plurality of data transmission control stations (hereinafter termed simply as stations) having computers and/or various terminal devices connected thereto are interconnected in cascade through a single loop transmission line, wherein data transmission can be effected between any one of the stations.

In the loop type data highway system mentioned above, only one of the stations is permitted to transmit data at one time. Consequently, control must be provided in such a manner that the station demanding data transmission may first acquire the permission to reserve the line and upon completion of the data transmission, the line is released and transferred for reservation by another station.

All the controls involved in acquiring and releasing reservation of the line are herein generally referred to as the line control.

A data transmission control system of the control station fixing type in which only a particular station (control station) is imparted with the line control function is certainly advantageous in that all the other stations need not be additionally provided with the respective line control functions. However, this type of data transmission control system can not enjoy a high data transmission efficiency, because every station must inform the control station of completion of the transmission every time the data transmission has been completed. There is suggested in T. Nakano's Japanese Patent Application Laid-Open No. 115105/1977 (Application No. 31312/1976) a data transmission control system of the type in which the line control function is not exculsively carried out by any particular station, but any station having completed a respective data transmission serves as the control station.

However, in the data transmission control system according to the prior art mentioned above, each of the stations has to receive and repeat a polling frame (also referred to as POL frame) transmitted by the control station (i.e. the station serving as the control station) for inquiring as to the presence of a demand or request for line reservation by a station. Such being the case, each of the stations can not repeat the POL frame until it has completely received that POL frame, causing reduction in the data transmission efficiency.

An object of the present invention is to provide a novel data highway system of the loop type which is capable of performing line control while improving the data transmission efficiency.

Another object of the present invention is to provide a loop type data highway system which allows the repeating delay involved in each of the stations to be significantly reduced.

A further object of the invention is to provide a loop type data highway system in which the POL frame can be processed at an increased speed.

According to a characteristic feature of the invention, the POL frame inquiring about the request for reservation of the line is constituted by first and second fields, and each of the stations receives a signal including the POL frame through the upstream line (i.e. from a station located upstream of the loop line) and repeats without delay the signal to be sent onto the downstream line (i.e. to a station located downstream of the loop line). The station which requests reservation of the line sends out the POL frame to the outgoing line by writing a signal indicating the request for line reservation in the second field of the POL frame and starts transmission of the data following transmission of the second field only when the contents of the second field of the POL frame incoming from the upstream line indicates the unreserved state of the line.

According to another aspect of the invention, the signal written in the second field of the POL frame is composed of a train of the same binary bits, wherein one of the binary values is utilized for representing the unreserved state of the line, while the other binary value represents the reserved state of the line. With this arrangement, the second field of the POL frame can be detected with greater reliability and easiness.

The above and other objects, features and advantages of the invention will be more clearly understood from the description of preferred embodiments thereof taken in conjunction with the accompanying drawings in which.

Figure 1:
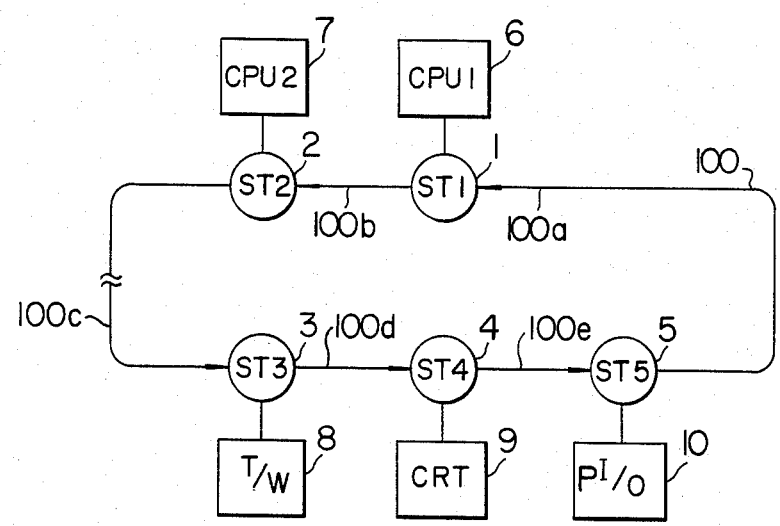
FIG. 1 shows schematically a conventional loop type data highway system to which the invention may be applied.

Referring to FIG. 1 which shows, by way of example only, a general arrangement of a loop type data highway system, data transmission control stations ST1 to ST5 are connected to a loop-like transmission line to constitute a closed loop system.

Computers 6 (CPU 1) and 7 (CPU 2) are connected to the stations ST1 and ST2, respectively, while a typewriter (T/W) 8 is connected to the station ST3, a cathode ray tube (CRT) display 9 is connected to the station ST4 and a process input/output (P I/O) 10 is connected to the station ST5.

These various information or data processing devices are interconnected with each other by way of the respective stations so that data transmission may take place between any given two of the processing devices. Although only five stations 1 to 5 are shown in the figure for convenience of description, it should be understood that in practical applications, a larger number of stations are usually connected in the closed loop.

With the loop arrangement mentioned above, only one station is allowed to transmit data at a given time, as described hereinbefore. Accordingly, in case a plurality of the stations issue simultaneously the request for data transmission, it is necessary to select or determine one of the stations to which the priority is given.

Figure 2:
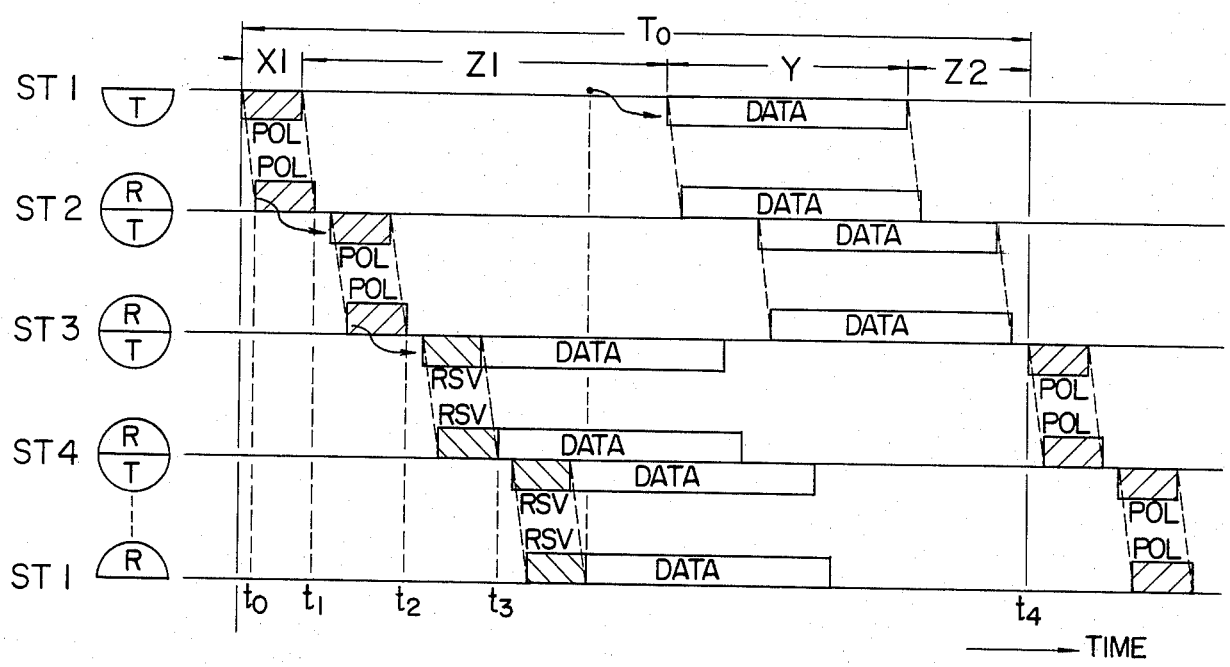
FIG. 2 shows a timing chart for illustrating procedures for data transmission in a hitherto known handed-round control station system.

A typical example of the hitherto known procedures for data transmission in the system of the type in which line control is handed from station to station is illustrated in FIG. 2.

Referring to FIG. 2, it is assumed that the station ST1 has just completed a data transmission and has sent out the POL frame for inquiring whether other stations have a need for reservation of the line, and that the stations ST3 and ST4 have line reservation requests, respectively.

The POL pattern (i.e. the contents of the POL frame) sent out by the station ST1 is received by the station ST2 by way of a line section (upstream line) 100 b.

In the station ST2, the leading bit of the POL pattern is received at a time point $t_o$. However, it is impossible to determine at this time point whether the bit as received is of the POL pattern.

It is at a time point $t_1$ that the POL pattern is identified. However, the station ST2 has no need for line reservation. Accordingly, the POL pattern is repeated to the outgoing line section (downstream line) 100 c.

In a similar manner, the station ST3 can identify the POL pattern at a time point $t_2$. Since this station ST3 has a need for reservation of the line, the POL pattern is rewritten into a reserve or RSV pattern which is then sent out onto a downstream line section 100 d. Here, the reserve or RSV pattern is used for announcing that the line is reserved by a station. Following the RSV pattern, the station ST3 sends out data to be transmitted.

Figure 3:
FIG. 3 shows a frame structure of data.

The frame structure of data is based on the high level data link control (HDLC) procedure, as illustrated in FIG. 3 by way of example. The frame is constituted by flag fields F indicative of the beginning and the end of the frame, respectively, a receive station address field DA, a control code field C, a transmit station address field SA, data fields $I_1, I_2, \ldots, I_n$ and an error control field RSC.

The station ST4 receives at a time point $t_3$ the RSV pattern sent out by the station ST3 and is aware of that the line is reserved by some upstream station.

Accordingly, although the station ST4 also has a request for line reservation, this station ST4 is not allowed to reserve the line in view of the RSV pattern and therefore operates merely in the repeat mode.

When the RSV pattern reaches the station ST1 which sent out the POL pattern, the station ST1 is aware that the line is reserved by another station and then the station ST1 is changed over from the data transmission mode in which its own data is transmitted to the repeat mode in which the data received from the station ST3 following the RSV pattern is repeated to the downstream side.

When the data sent out by the station ST3 returns to the station ST3, it recognizes that the transmission of data has been completed and cancels the reservation of the line and begins to send out the POL pattern for checking other stations for a request for line reservation.

As can be seen in FIG. 2, a single data transfer cycle $T_o$ which lapse from the generation of the POL pattern to the generation of the next POL pattern following the completed data transmission is determined by the length X1 of the POL pattern, the length Y of data and times Z1 and Z2 involved due to delays in transmission on the line and in repeating at the stations.

The effecive efficiency E of data transmission between any two stations is given by the following expression:

$$E = \frac{Y}{X1 + Y + Z1 + Z2} \times 100 \, (\%)$$

In this connection, a problem resides in that a delay corresponding to the length X1 of the POL pattern is necessarily required for each of the stations to detect the POL pattern and rewrite it as the RSV pattern if the station has a need for reservation of the line.

It should be noted that is is impractical to provide a system arrangement in which only the station having a need for reservation of the line delays sending the POL pattern, while the other stations which have no need for reservation of the line send the POL pattern is impractical without delay is impractical, because the data may become degraded during transmission. The being delays in the individual stations are thus accumulated into a greater value of Z1+Z2, eventually resulting in degradation of the transmission efficiency.

The problem mentioned above becomes more serious, as the bit transmission rate is lower, the data is more lengthy and/or the number of the stations increases.

Figure 4:
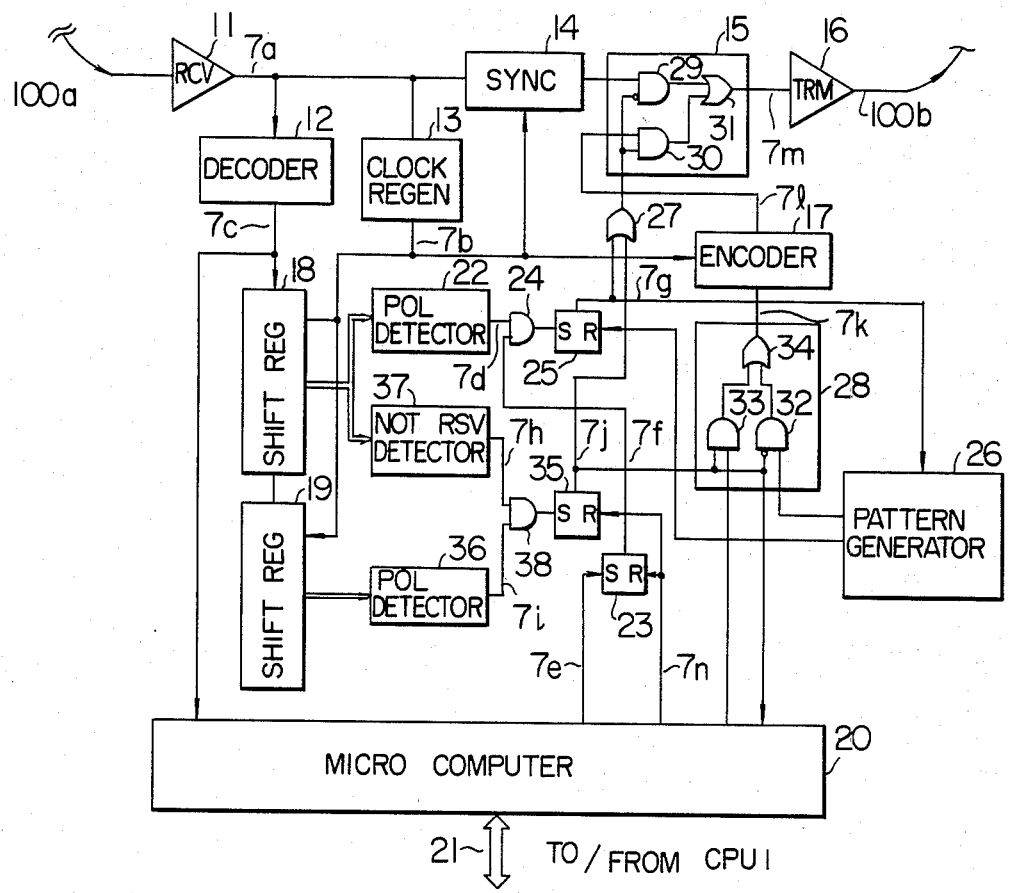
FIG. 4 shows in a block diagram a circuit arrangement of a station which incorporates the line control function according to an embodiment of the invention.
Figure 5:
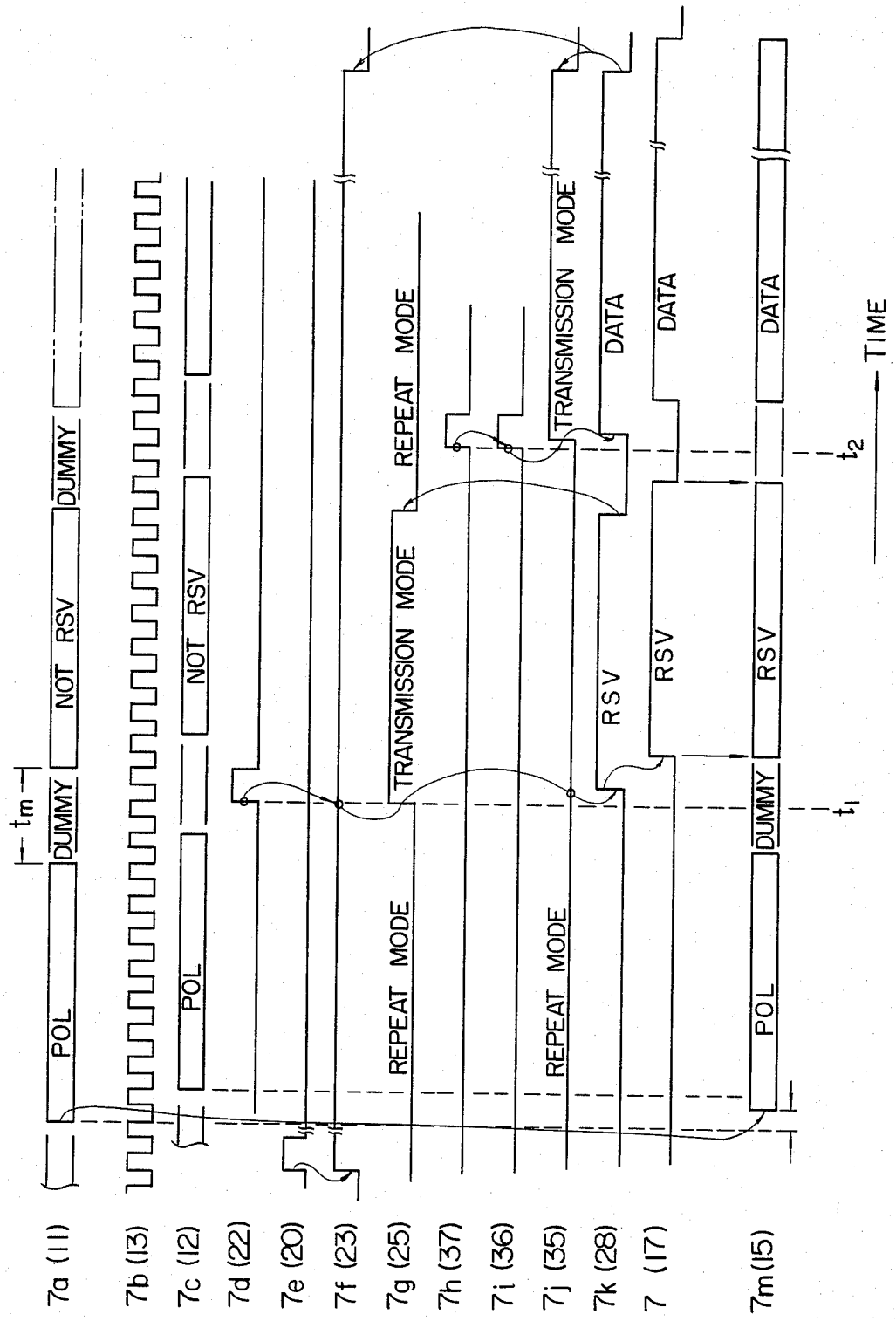

FIG. 4 shows an exemplary embodiment of the station for carrying out the line control according to the invention, and FIG. 5 shows a time chart to illustrate the operation.

Referring to FIG. 4, a receiver circuit 11 receives the data signal incoming along the upstream transmission line 100 a and produces an output signal 7a which is supplied to a decoder circuit 12 and a clock regenerating circuit 13. At the same time, the output signal 7a, after being synchronized by snychronizer circuit 14, is sent out to the downstream transmission line 100 b through a selector 15 and a transmitter circuit 16.

The data received from the upstream transmission line 100 a is sent out onto the downstream transmission line 100 b without any substantial delay.

The decoder circuit 12 serves to derive a Non-Return-to Zero (NRZ) signal from a Manchester-coded signal, for example.

In contrast, an encoder circuit 17 described hereinafter serves to derive the Manchester-coded signal from the NRZ signal.

Figure 6:
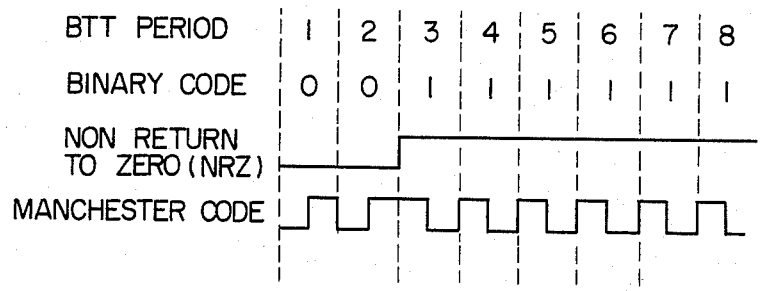
FIGS. 5 and 6 show time charts to illustrate operations of the circuit shown in FIG. 4.

The relationship between the NRZ signal and the Manchester code signal is illustrated in FIG. 6.

Although the Manchester code signal and the NRZ signal are not discriminately shown in FIG. 5, it will be readily understood that the output 7a of the receiver circuit 11 is of the Manchester code, while the output 7c of the decoder circuit 12 is the NRZ signal.

The output NRZ signal 7c of the decoder circuit 12 is sequentially loaded into shift registers 18 and 19 under the timing of a clock signal 7b outputted by the clock regenerating circuit 13. On the other hand, the output signal 7c is fetched into a microcomputer 20 which then decides on the basis of the inputted NRZ signal whether or not that station is addressed by the data signal. When it is determined that the station is addressed, the succeeding data is fetched into the microcomputer 20 to be processed.

Operation of the microcomputer 20 is substantially similar to that of the micro-program controller 20 shown in FIG. 5 of U.S. Pat. No. 4,136,384 issued to M. Okada et al. When the data addressed to the station is received, it is transferred to a CPU 1 (not shown) through a bus 2.

When the POL pattern in the signal 7a is received and loaded into the shift register 18 by a predetermined number of bits (8 bits in the case of the example illustrated in FIG. 5), a POL detector 22 detects the POL pattern (refer to FIG. 5, 7a).

When the station has a request for the line reservation for data transmission, the microcomputer 20 then outputs a transmission request signal 7e to thereby set a flip-flop 23.

When the output signal 7d of the POL detector 22 and the output signal 7f of the flip-flop 23 establishes an AND condition, an AND gate 24 sets a flip-flop 25. The output signal 7g of the flip-flop 25 is effective to enable a pattern generator 26 to generate the RSV pattern indicative of the line reservation state and, at the same time, change over a selector 15 to the transmission mode through an OR gate 27. The RSV pattern produced by the pattern generator 26 is supplied to the encoder 17 through a selector 28 to be transformed into the Manchester code signal which is then sequentially sent out to the downstream line 100 b through the selector 15 and the transmitter circuit 16.

The selector 15 is composed of an INHIBIT gate 29, and AND gate 30 and an OR gate 31. When a logic "1" appears at the output of the OR gate 27, the selector 15 is set to the transmission mode, whereby the output signal 7h of the encoder 17 is supplied to the transmitter circuit 16. On the other hand, the logic "0" at the output of the OR-gate 27 causes the selector 15 to be set to the repeat mode to fetch the output signal from the synchronization regenerating circuit 14.

On the other hand, the selector 28 is composed of an INHIBIT gate 32, an AND gate 33 and an OR gate 34. When the output signal 7j of a flip-flop 35 described hereinafter is logic "1", the transmission data from the microcomputer 20 is fetched by the selector 28. In contrast, for the output signal 7j of logic "0", the output pattern signal from the pattern generator 26 is fetched. In this manner, when any station has a request for data transmission, the POL pattern of the received data is reproduced and repeated without delay, as is illustrated at 7m in FIG. 5, and followed by the RSV pattern produced by that station.

By the way, the POL pattern is merely loaded in the shift register 19 and detected by a POL detector 36 at a time point t$_2$ shown in FIG. 5. When a detector 37 which may be termed as a NOT-RSV detector detects at that time point a NOT-RSV pattern indicative of the reserved state of the line, an AND gate 38 is enabled to set the flip-flop 35, which means that the associated station has acquired reservation of the line. As a consequence, the selector 15 is changed over to the transmission mode by way of the OR gate 27, while the data to be transmitted by the station is supplied to the encoder 17 through the selector 28 to be sent out to the downstream line 100 b. In the case where the POL detector 36 detects the POL pattern while the NOT-RSV detector 37 does not detect the NOT-RSV pattern, that is, when the RSV pattern indicating that reservation of the line is detected, the AND gate 38 is disenabled, resulting in the flip-flop 35 being reset, whereby the selector 15 is placed in the repeat mode in which the output signal of the synchronization regenerating circuit 14 is selected.

As is apparent from the time chart shown in FIG. 5, the repeating delay time involved between the reception of the data signal as shown in FIG. 7a and the transmission of the data signal as shown in FIG. 7m amounts to only the delay time td which is required for synchronization by the synchronizing circuit 14 which falls well within a one-bit interval. Thus, the delay time involved by the repeating operation can be significantly reduced when compared with the hitherto known data transmission control system in which the delay corresponding to the length of the POL pattern (8-bit interval in the case of the example illustrated in FIG. 5) is inevitable as described hereinbefore.

Turning to FIG. 4, the flip-flop 25 is reset when the pattern generator 26 has completely sent out the RSV pattern, while the flip-flops 23 and 25 are reset by the microcomputer upon completion of the data transmission.

In FIG. 5, an interval tm shown as interposed between the POL pattern and the NOT-RSV pattern is a dummy time which is provided for compensating for the delays involved by the decoder 12, the POL detector 22 and the encoder 17 in each station, and which may be a three-bit interval, for example.

Although the two shift registers 18 and 19 are employed in cascade connection, it will be appreciated that the single shift register may be employed to the same effect, so far as the bit capacity of the shift register is equal to or greater than the sum of bits of the POL pattern, the dummy interval and the NOT-RSV pattern.

In this case, the POL detectors 22 and 36 and the NOT-RSV detector 37 can be realized by a single programmable logic array PLA which produces a single bit detection signal in response to each appearance of the particular pattern of "POL" or "NOT RSV". By the way, a large scaled integrated circuit (LSI) incorporating the decoder 12, the clock regenerating circuit 13, the synchronizing circuit 14 and the encoder 17 in a unit is commercially available, for example, from Harris Semiconductor Co. as "HD-6409" i.e. CMOS Manchester Encoder-Decoder (reference may be made to the product manual published by Harris Semiconductor Co. 1981). A predetermined particular bit pattern is prepared for the POL pattern to discriminate it from the data. Further, the NOT-RSV pattern may be constituted by binary "1", while the RSV pattern is constituted by binary "0". Although the NOT-RSV pattern is shown as having an eight-bit length like the POL pattern in the time chart shown in FIG. 5, the NOT-RSV pattern having a 3- or 4-bit length can be discriminated more distinctly from the RSV pattern.

When the NOT-RSV pattern or the RSV pattern is prepared by a train of bits of the same binary value, the detection is easily and reliably made as to whether information in concern is the NOT-RSV or the RSV pattern by detecting the presence of successive "0's" or "1's" following the POL pattern.

The dummy pattern is neglected on detection of the POL pattern or NOT-RSV pattern. However, when the POL pattern is prepared such that "0, 0, 1, 1, ..., 1", it is then easy to detect whether information appearing in succession to the POL pattern is the NOT-RSV or the RSV pattern, provided that both the dummy pattern and the NOT-RSV pattern are prepared each by a train of bits of the same binary value, e.g. binary "1's". In other words, the NOT-RSV detector is only requied to detect whether a train of binary "1's" is present or not after the POL pattern.

Figure 7:
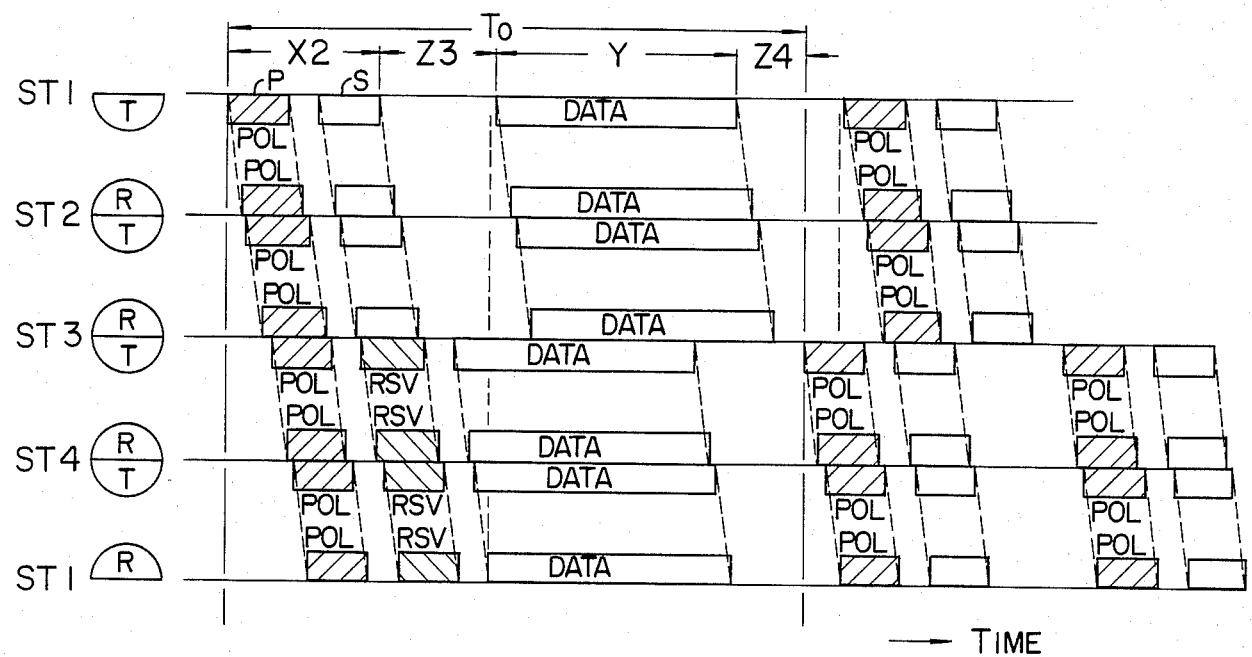
FIG. 7 is a view similar to FIG. 2 and illustrates procedures for transmission according to the invention.

FIG. 7 shows exemplarily procedures for transmission in the system the of turning control station type according to the invention.

As will be understood by comparing the illustration shown in FIG. 7 with that of FIG. 2, the invention differs from the prior art in that the polling frame (POL) is constituted by a first field P (i.e. POL pattern) and a second field S and that the first field P and the second field S are regenerated and repeated without any substantial delay in each station.

The polling frame constituted by the first field P and the second field S according to the invention has a larger length as indicated by X2 when compared with the frame X2 shown in FIG. 2. However, since the time interval Z3+Z4 is significantly reduced because of saving of any substantial delays due to the regeneration and repeating, the efficiency of data transmission is remarkably enhanced.

In the case of the example illustrated in FIG. 7, it is assumed that the station ST3 sends out the POL pattern after the transmitted data has traveled one round along the loop back to the original station ST3. However, the POL pattern may be sent out immediately after the data transmission has been completed.

Figure 8:
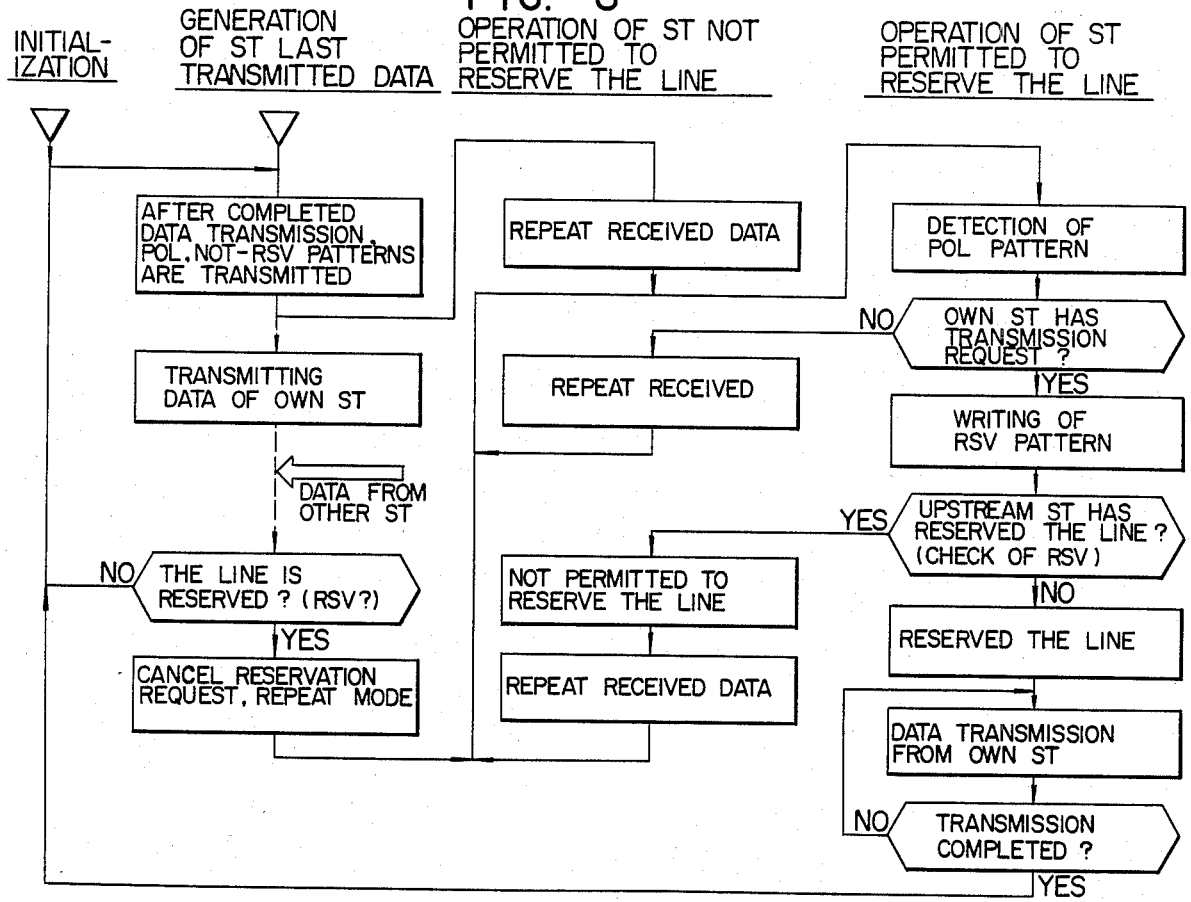
FIG. 8 shows a flow chart to illustrate the line control procedures according to the invention in summarization.

FIG. 8 shows in a flow chart the line control procedures according to the invention in summarization.

The preceding station which has transmitted data the last time now sends out the POL pattern and the NOT-RSV pattern to thereby cancel the reservation of the transmission line. Usually, the POL pattern and the NOT-RSV pattern are merely regenerated and repeated in each of the other stations. When the POL pattern is detected in each station, it is then determined whether or not the particular station has the transmission request (i.e. the request for reservation of the transmission line). The station having no transmission request immediately assumes the received data repeating mode.

On the other hand, the station having the transmission request writes, in advance, the RSV pattern into the second field of the reproduced polling frame and thereafter checks the subsequently received polling frame of the upstream station to ascertain whether or not the line has been already reserved by the upstream station. If reserved, the station having the transmission request assumes the received data repeat mode, as the line can not be reserved by this station.

Only when the line has not been reserved yet (i.e. only upon appearance of the NOT-RSV pattern), the station having the transmission request is allowed to initiate the transmission of its own data. Upon completion of the data transmission, the station sends out the POL pattern and the NOT-RSV pattern to thereby cancel reservation of the line.

Comparison of the line control systems according to the invention and the prior art with respect to the transmission efficiency was performed on the below mentioned conditions, and the results are summarized in the following table:

1. Transmission rate: 1 Mb/sec.
2. Overall length of the loop: 500 m
3. Lengths of data: 64 to 512 bytes
4. Number of stations: 64 at maximum

TABLE

| | Number of Stations | Length of Data | Transmission Efficiency Prior Art | Transmission Efficiency Invention |
|---|---|---|---|---|
| I | 64 | 64 bytes | 40% | 72% |
| II | 64 | 512 bytes | 84% | 95% |
| III | 30 | 64 bytes | 5% | 74% |

As will be seen from the above table, when the number of the stations is increased from 30 to 64 in the prior art line control system, the transmission efficiency is remarkably decreased from 54% down to 40%. In contrast, reduction of the transmission efficiency is only by 2% from 74% down to 72% in the case of the line control system according to the invention. This is explained by the fact that substantially no delay occurs in the repeating operation performed by each station.

It will also be understood that the line control system according to the invention can enhance the transmission efficiency significantly when compared with the hitherto known system with the same number of stations and the same data length.

We claim:

1. A loop type data highway system in which a plurality of stations are connected in cascade to a loop transmission line so that any station may transmit data on said transmission line to another station in response to receipt of a polling frame inquiring of a need by the station for reservation of said transmission for exclusive use in transmitting data, said polling frame including at least a first polling field and a second field indicating reservation status; wherein each of said stations comprises first means for receiving signals on said transmission line from the station located upstream therefrom on said line and for repeating sequentially the received signals on said transmission line to the station located downstream therefrom on said line; second means responsive to detection of the first field of the polling frame in the received signal to generate a reservation signal pattern indicative of the line being reserved when the station has a need for reservation of the line and for causing said generated reservation signal pattern to be sent out by said first means without delay in place of the second field of the received polling frame on the transmission line downstream of said station; third means for providing data to be sent on said transmission line to another station; and fourth means responsive to detection of the second field of said received polling frame indicative of the line being non-reserved for causing said first means to sent out on said transmission line said data provided by said third means subsequent to the sending out of said generated reservation pattern.

2. A loop type data highway system according to claim 1, wherein said first field comprises a predetermined bit pattern, while said second field comprises one of two different bit patterns depending on whether said line is in the reserved state or in the non-reserved state.

3. A loop type data highway system according to claim 1, wherein said first field comprises a predetermined bit pattern, while said second field comprises a train of bits of the same binary value.

4. A loop type data highway system according to claim 3, wherein said same binary value is one binary value when said line is in the reserved state and the other binary value when said line is in the non-reserved state.

* * * * *